United States Patent

Fassett, II

[15] 3,641,815

[45] Feb. 15, 1972

[54] WIND DIRECTION INDICATOR

[72] Inventor: James M. Fassett, II, 23320 Anza Ave., Torrance, Calif. 90505

[22] Filed: Jan. 10, 1968

[21] Appl. No.: 696,789

[52] U.S. Cl. ............................................. 73/188, 308/36.1
[51] Int. Cl. ......................................................... G01w 1/00
[58] Field of Search .................... 73/188, 189, 186; 116/117, 116/114; 252/49.6; 308/36.1

[56] References Cited

UNITED STATES PATENTS

| 375,201 | 12/1887 | Schaufuss | 73/188 |
|---|---|---|---|
| 2,363,087 | 11/1944 | Salisbury | 73/188 |
| 2,836,064 | 4/1957 | York | 73/188 |
| 3,196,678 | 7/1962 | Toro | 73/188 |
| 3,316,761 | 5/1967 | Frith et al. | 73/189 |
| 3,478,585 | 11/1969 | Scannell | 73/188 |

OTHER PUBLICATIONS

"Airfoil"—Mc-Graw Hill Encyclopedia of Science & Technology, (1966, U.S.) Libr. Congr. #65-26484 p. 198, Vol. 1
"Potentiometer"— Ibid, vol. 10, p. 542, 3 & 4
"Rheostat"— Ibid, vol. 11, p. 545
"Streamlining"— Ibid, vol. 13, p. 175-6

Primary Examiner—Richard C. Queisser
Assistant Examiner—Marvin Smollar
Attorney—Don B. Finkelstein

[57] ABSTRACT

There is disclosed herein a wind direction indicator in which an improved weather vane incorporating an elongated airfoil-shaped member for providing the weather vaning is coupled to a potentiometer enclosed in a housing. The potentiometer is coupled to an indicating means that provides a visual display. Mechanically, the weather vane coupling to the potentiometer is within a cavity of the housing that is utilized also as an oil reservoir for lubricating the shaft of the weather vane and the potentiometer so that free rotation thereof may be obtained over extended periods of operation without servicing. The indicating means has two modes of operation on the display device for providing both a high scale and a low scale. That is, when the invention is utilized in boat applications for indicating the direction of the wind relative to, for example, the centerline of the boat extending from the bow to the stern when sailing off the wind the relative wind can have comparatively high-angular relationship to the centerline of the boat and consequently the display device indicates with comparatively large increments the large angular displacements. In the second mode of operation for a sailboat when running close hauled, the angle of the relative wind is comparatively more important and generally the angle will be in a range of between 20° and 50° from the centerline. Consequently, in the second mode of operation the 20° to 50° range of angles of relative wind is expanded to cover the full range of the display device for indicating such angles with comparatively small increments. Signal-damping means are also included so that short time duration wind changes will not provide excessive signal variations in the display device.

10 Claims, 4 Drawing Figures

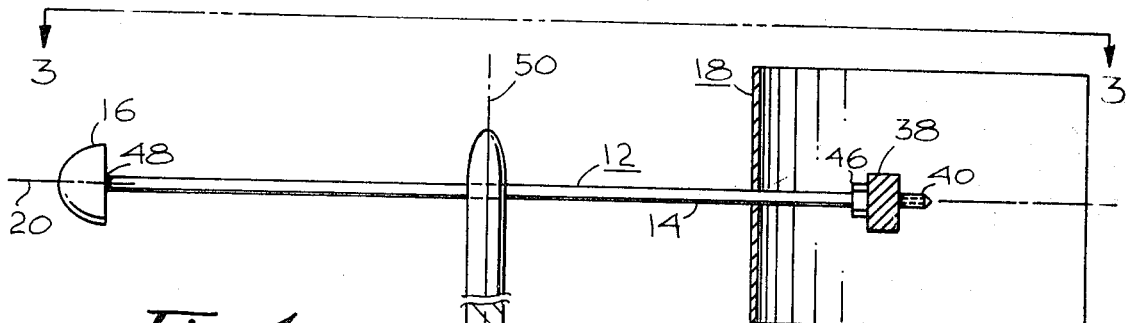
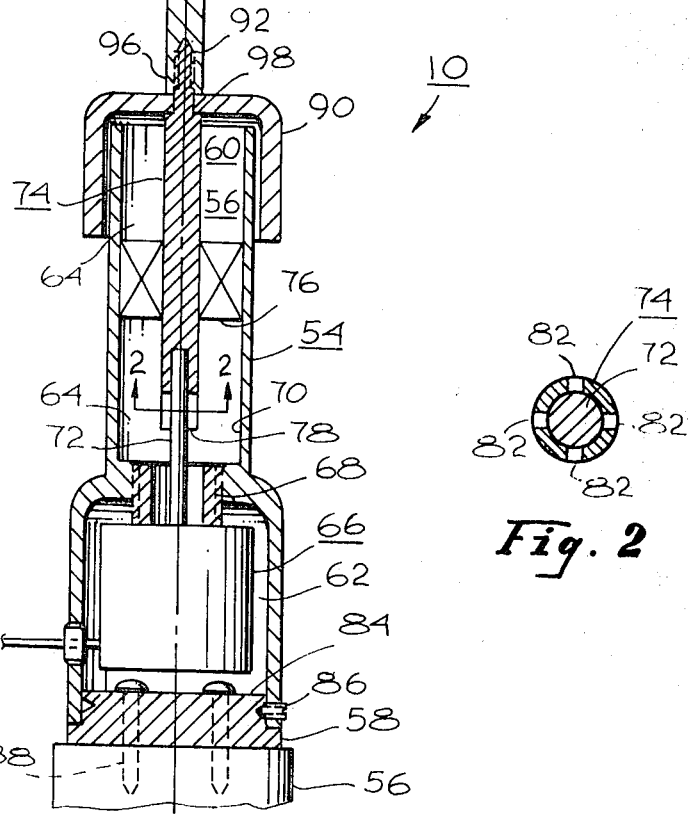
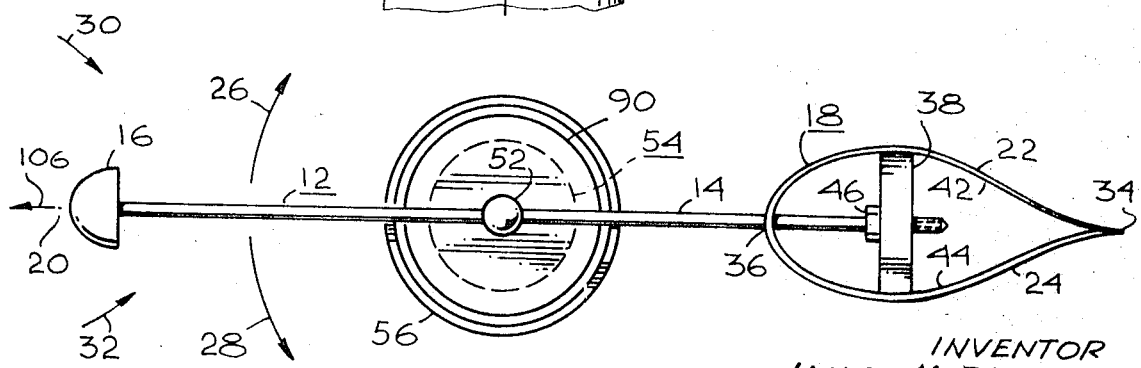

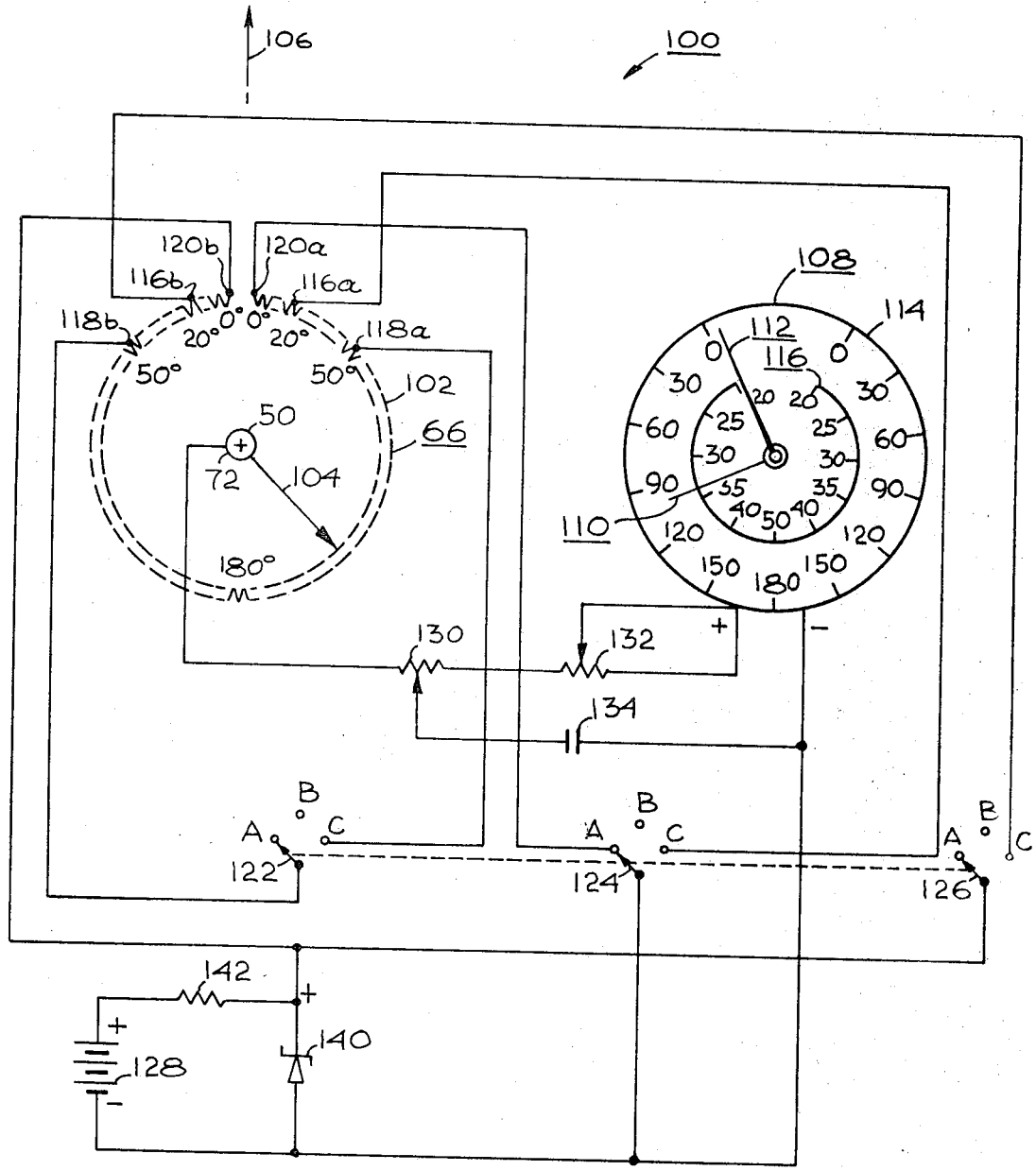
Fig. 4
INVENTOR
JAMES M. FASSETT, II
ATTORNEY

METHOD FOR SURFACE TREATMENT OF NICKEL AND COBALT BASE ALLOYS

This invention relates to the art of aluminizing metal surfaces by diffusion to provide a surface on the metal which is rendered more resistant to corrosion or oxidation at high temperatures and/or in corrosive atmospheres, such as exist in a combustion engine, turbine, and the like. By diffusion of aluminum into the surface of such metals as high nickel or cobalt alloys and high alloy steels, heat shock erosion, corrosion resistance and other physical and mechanical properties are markedly improved.

To the present, in the aluminizing treatment by diffusion coating, the metal part is heated to a temperature above 1000° C. in a pack formed of a powdered mixture of metallic aluminum and aluminum oxides, without and preferably with a small amount of halide salt such as ammonium chloride or ammonium fluoride, for about 4 to 10 hours in a nonoxidizing atmosphere.

The aluminum diffuses into the surface, usually to a depth within the range of about 10–20 microns, depending somewhat upon the time and temperature of the aluminizing treatment and the amount of aluminum in the pack, with the amount of aluminum in the diffusion layer decreasing from the surface inwardly toward the center in amounts somewhat proportionate to the distance from the surface.

It is an object of this invention to provide an improved aluminized article and method for preparation of same wherein the diffusion coating of aluminum remains concentrated in a narrow layer on the surface of the article without excessive diffusion into the interior of the article; whereby a better bond is achieved between the diffusion coating and metal substrate; and whereby a complex series of compounds are formed in the diffusion layer to provide an improved coating which offers higher temperature corrosion resistance.

In accordance with the practice of this invention, the parts formed of a superalloy, and preferably nickel and cobalt based alloys, are first processed to provide the surface portions to be aluminized with a thin coating of nickel, in a first coating step. The coated parts are then packed in the conventional manner and conventional compositions for aluminizing the surface by diffusion transfer of aluminum. The presence of nickel as a precoat on the metal surface is believed to operate as a barrier coat which concentrates the diffused aluminum in the surface portions of the metal parts to provide an aluminized surface having greatly improved corrosion resistance, especially when measured at high temperature and in the presence of highly corrosive gases.

In the described two-stage process of first nickel plating and then diffusion coating to aluminize the plated surface by a pack cementation process it is desirable to deposit a nickel coating in the first stage having a thickness greater than 0.0001 inch and preferably having a thickness within the range of 0.0001 to 0.001 inch.

The desired thickness of nickel coating can be deposited by conventional electroplating processes, such as described in the article published by the ASM Committee on Nickel Plating, entitled Nickel Plating, published in the *Metals Handbook*, Volume II, pages 432–443, under general purpose plating baths. Instead, the desired thickness of nickel coating can be deposited on the surface of the parts nonelectrically, as described on pages 443–445 of the *Metals Handbook*, Volume II, supra, under the heading Nonelectrolytic Nickel Plating.

The aluminizing pack employed in the pack cementation process for aluminizing the nickel-coated surfaces can be formulated to contain aluminum metal in finely divided form in an amount within the range of 0.1 to 10 percent by weight with the remainder formed of a finely divided filler, preferably alumina. Although it is not essential, use can be made of an energizer, such as ammonium chloride or ammonium fluoride, in an amount within the range of 0.01 to 5 percent by weight of the pack. A hydrogen or inert atmosphere is maintained during diffusion coating while the materials are heated to a temperature within the range of 1,800° to 1,200° F. or a time sufficient to build up a final coating thickness within the range of 0.001 to 0.005 and preferably within the range of 0.0015 to 0.003 inch. The desired coating thickness is obtained with a pack of the type described in about 9 to 10 hours of heating.

The following examples are given by way of illustration, but not by way of limitation, of the practice of this invention:

Alloy Composition:

Example 1

|  | Percent by Weight |
|---|---|
| Ni | 70.0 |
| Cr | 12.0 |
| W | 5.0 |
| Al | 5.0 |
| Mo | 3.5 |
| Ti, Nb, Ta | 2.5 |
| Fe, C, Mn, Si | Balance |

Example 2

|  | Percent by Weight |
|---|---|
| Co | 60.0 |
| Cr | 20.0 |
| W | 10.0 |
| Nb | 2.0 |
| Ni | 1.0 |
| Fe, C, Mn, Si | Balance |

Example 3

|  | Percent by Weight |
|---|---|
| C | 0.08 |
| Mn | 0.75 |
| Si | 0.75 |
| Cr | 19.0 |
| Co | 19.5 |
| Mo | 4.0 |
| Ti | 2.9 |
| Al | 2.9 |
| Fe | 4.0 |
| Ni | Balance |

Example 4

|  | Percent by Weight |
|---|---|
| C | 0.12 |
| Mn | 0.15 |
| Si | 0.4 |
| Cr | 13.0 |
| Mo | 4.5 |
| Ti | 0.6 |
| Al | 6.0 |
| Fe | 1.0 |
| Cb | 2.25 |
| Ni | Balance |

First stage of nickel coating:

Example 5

Composition of Electrolytic Bath

| | |
|---|---|
| Nickel sulfate, $NiSO_4 6H_2O$ | 30 to 55 |
| Nickel chloride, $NiCl_2 6H_2O$ | 4 to 8(a) |
| Nickel sulfamate, $Ni(SO_3NH_2)_2$ | — |
| Nickel fluoborate, $Ni(BF_4)_2$ | — |
| Total nickel as metal | 7.7 to 14.2 |
| Boric acid, $H_3BO_3$ | 4 to 6 |
| Antipitting additives | (b) |

Operating Conditions

| | |
|---|---|
| pH | 1.5 to 5.2 |
| Temperature F. | 115 to 160 |
| Current density, a. per sq. ft. | 10 to 100 |

Example 6

Composition of Electrolytic Bath

| | |
|---|---|
| Nickel sulfate, NiSO$_4$6H$_2$O | — |
| Nickel chloride, NiCl$_2$6H$_2$O | 0 to 4 |
| Nickel sulfamate, Ni(SO$_3$NH$_2$)$_2$ | 35 to 60 |
| Nickel fluoborate, Ni(BF$_4$)$_2$ | — |
| Total nickel as metal | 8.2 to 15 |
| Boric acid, H$_3$BO$_3$ | 4 to 6 |
| Antipitting additives | (b) |

Operating Conditions

| | |
|---|---|
| pH | 3 to 5 |
| Temperature F. | 100 to 140 |
| Current density, a. per sq. ft. | 25 to 300 |

Example 7

Composition of Electrolytic Bath

| | |
|---|---|
| Nickel sulfate, NiSO$_4$6H$_2$O | — |
| Nickel chloride, NiCl$_2$6H$_2$O | 0 to 2 |
| Nickel sulfamate, Ni(SO$_3$NH$_2$)$_2$ | — |
| Nickel fluoborate, Ni(BF$_4$)$_2$ | 30 to 40 |
| Total nickel as metal | 7.6 to 10.5 |
| Boric acid, H$_3$BO$_3$ | 2 to 4 |
| Antipitting additives | (b) |

Operating Conditions

| | |
|---|---|
| pH | 2.5 to 4 |
| Temperature, F. | 100 to 160 |
| Current density, a. per sq. ft. | 25 to 300 |

Example 8

Composition Nonelectrolytic Bath

| | |
|---|---|
| Nickel chloride (NiCl$_2$6H$_2$O) | 80 oz. per gal. |
| Boric acid (H$_3$BO$_3$) | 4 oz. per gal. |

Operating Conditions

| | |
|---|---|
| pH | 3.5 to 4.5 |
| Temperature | 160° F. |

Example 9

Composition Nonelectrolytic Bath

| | |
|---|---|
| Nickel chloride | 30 |
| Nickel sulfate | — |
| Sodium hypophosphite | 10 |
| Sodium acetate | — |
| Sodium hydroxyacetate | 50 |
| Sodium succinate | — |
| Lactic acid (80%) | — |
| Propionic acid (100%) | — |

Operating Conditions

| | |
|---|---|
| pH | 4 to 6 |
| Temperature, F. | 190 to 210 |
| Plating rate (approx.), mil per hr. | 0.5 |

Example 10

| Aluminizing Pack: | |
|---|---|
| 5 pounds | powdered aluminum metal |
| 100 pounds | powdered alumina |

Example 11

| | |
|---|---|
| 7 pounds | powdered aluminum metal |
| 100 pounds | powdered alumina |
| 0.2 pound | ammonium chloride |

In the electrolytic plating systems of Examples 5 to 7, the part is suspended as a cathode in the electrolyte until a coating thickness within the range of 0.0001 to 0.001 inch has been deposited. The part is then removed and rinsed with water to remove electrolytic.

In the nonelectrolytic systems of Examples 8 and 9, a thinner nickel coating is deposited on the metal surfaces. In practice, the parts are immersed in the bath with continuous movement until a nickel coating having a thickness within the range of 0.0001 to 0.001 inch is deposited and the part is then removed and rinsed.

The nickel plated parts are packed with the pack composition of Examples 10 and 11 in a retort. The parts formed of the cobalt alloy of Example 2 are heated in a hydrogen atmosphere for 10 hours at 1950° F. while the parts formed of the nickel-based alloys of Examples 1, 3 and 4 are heated in a hydrogen atmosphere for 9 hours at 1,950° F. to form parts having a final coating thickness within the range of 0.0015 to 0.003 inch.

Instead of making use of the nickel or cobalt based alloys of Examples 1 to 4, use can be made of parts formed of nickel or cobalt based superalloys in which corrosion resistance at high temperature and resistance to deterioration by the sulfides present in corrosive gases is greatly improved.

The term "powdered" or "finely divided" form, as applied to the elements in the pack composition, is meant to refer to aluminum metal particles of preferably less than 5 microns and is meant to refer to particles of less than 100 microns and preferably within the range of 5–100 microns for the filler or alumina component of each pack.

It will be understood that changes may be made in the details of formulation and operation without departing from the spirit of the invention, especially as defined in the following claims.

We claim:

1. A method for surface treatment to improve the corrosion resistance of products having surface portions formed of a metal selected from the group consisting of nickel base alloys, cobalt base alloys, and superalloys, comprising the steps of applying a first coating of nickel on surfaces of the product, and then aluminizing the nickel coated surfaces by diffusion transfer.

2. The method as claimed in claim 1 in which the first coating of nickel is applied in a coating thickness greater than 0.0001 inch.

3. The method as claimed in claim 1 in which the first coating of nickel is applied by a nonelectrolytic system in a coating thickness within the range of 0.0001 to 0.001 inch.

4. The method as claimed in claim 1 in which the first coating of nickel is applied in a coating thickness within the range of 0.0001 to 0.001 inch.

The axial length of the cavity 56 is selected by applicant, in the preferred embodiment of applicant's invention, to provide an additional volume beyond that occupied by the above-mentioned structure so that the additional volume therein may be utilized as an oil reservoir. Thus, in the preferred embodiment of applicant's invention, applicant fills the cavity 56 with oil and, when utilized in boat applications, applicant prefers to utilize an oil having a specific gravity greater than 1. Thus, with such an oil, such as a silicone oil, any water that might enter the top portion 60 of the cavity 56 floats to the top of any oil and does not interfere with lubrication of the bearing 76 of the potentiometer 66.

The base portion 58 of the cavity 56 is sealed closed by a base member 84 retained therein by setscrew 86. The base means 84 may be provided with mounting means such as screws 88 that are screwed into the mast 56 for securing the base means 84 thereto. The housing 54 is then secured to the base means 84 by the setscrew 86 for the retention thereon.

A cover means 90 is provided to cover the top portion 60 of the cavity 56 and is spaced a predetermined distance therefrom. In this embodiment of applicant's invention the cover 90 is coupled to the drive shaft 74 adjacent to the engagement end 92 thereof that threadingly engages the bottom portion 96 of the weather vane shaft 52. Thus, the cover 90 is clamped between the shoulder means 98 on the coupling shaft 74 and the bottom portion 96 of the weather vane shaft 52 so that the cover means 90 rotates with the rotation of the weather vane shaft 52. The weather vane shaft 52 due to the threading engagement of the coupling shaft 74 thereto rotates the coupling shaft 74 to rotate the potentiometer drive shaft 72 when the weather vane 12 rotates due to changes in the relative direction of the wind.

The potentiometer 66 is connected to an appropriate indicating means 100 for providing a visual indication of the direction of the wind relative to a predetermined direction.

FIG. 4 illustrates in schematic diagram form an indicating means that applicant prefers to use in the embodiment of applicant's invention described above. As shown thereon the potentiometer 66 may be considered to be comprised of a peripheral resistor 102 and a wiper arm 104 that rotates thereon. That is, the wiper arm 104 connected to the potentiometer drive shaft 72 so that it rotates about the axis 50 on the peripheral resistor 102. The potentiometer 66 is aligned so that the 0° position thereof is aligned with the centerline of the boat as indicated by the arrow 106. The direction indicated by the arrow 106 corresponding to the centerline of the boat may be considered a predetermined alignment direction from which the angle of the wind as indicated by the angular position of the weather vane 12 may be measured.

That is, as the weather vane 12 rotates in the direction as indicated by the arrow 26 and 28, as shown on FIG. 3, to align with the wind directions indicated by the arrows 30 and 32, respectively, the angles thereof relative to the direction indicated by the arrow 106 is the relative wind direction angle to be indicated by applicant's improved wind direction indicator 10.

In the preferred embodiment of applicant's invention a daul-range meter 108 is provided for the purposes hereinafter described and the dual-range meter 108 may be a voltmeter having a moving needle means 110 that moves in proportion to the movement of the wiper arm 104 of the potentiometer 66 and a pointer means 112 that may be adjusted manually to a desired angular position so that small movements of the needle means 110 relative thereto may be detected. Thus, the meter 108 provides a display means for the indicator means 100 in which the display means provides the visual display for observation of the relative wind direction.

The display means as indicated by the dual range meter 108 comprises an outer scale 114 for indicating wind directions between 0° and 180° both to port and starboard of the predetermined alignment direction 106 for the off-the-wind condition of sailboat sailors. The inner scale 116 is utilized when sailing close hauled and provides full scale deflection of the needle 110 for angles in the range of, for example, 20° to 50° as indicated on the potentiometer 66 in FIG. 4. That is, the inner scale 116 provides an indication through the movement of the needle 110 between the 20° position and 50° position on either port or starboard sides of the predetermined alignment direction 106. The expanded scale portion allowed by the dual range provides indications. for example, of wind variation on the order of 1° when utilizing the close hauled scale.

The potentiometer 66 is, therefore, provided with caps at the two 20° positions as indicated by the connections 116a and 116b and at the 50° position as indicated by the connections at 118a and 118b. Similarly, the potentiometer 66 is provided with connections at the 0° position as indicated by the connections 120a and 120b. It can be seen that there is a small geometric separation between these two 0° positions which, typically, may be on the order of just a few degrees such as 4° to 6°. This is inherent in the design of most potentiometers to prevent shorting of the peripheral resistor 102. In this application, however, particularly when utilized with sailboats, there is no need for reading wind direction within the range of 3° to port or starboard of the predetermined alignment direction 16 as such sailing conditions generally do not exist.

Three ganged switches designated 122, 124 and 126 are provided and these switches are coupled together so that they rotate together. Each of the switches has three positions. In the position shown on FIG. 4 at terminal A thereof of each one the circuitry is set up so that the display means 108 is reading in the off-the-wind mode of operation or on the outer scale 114. The terminals B of the switches 122, 124 and 126 are in off position to prevent power drain from the battery 128.

The C-terminal of each of the switches 122, 124 and 126 is the position for the close hauled condition or mode of operation in which the visual display means such as the meter 108 is reading on the inner scale 116 for the close hauled condition.

From the schematic diagram of FIG. 4 it can be seen that when the switches 122, 124 and 126 are in the position shown the connection 120a on the potentiometer 66 is connected through the A terminal on the switch 124 to the negative side of the battery 128. The wiper arm 104 is connected to variable resistor potentiometer 130 and variable resistor potentiometer 132 to the positive terminal on the visual display means such as meter 108 and the negative terminal on the visual display means such as meter 108 is connected to the negative pole of the battery 128. The variable resistance potentiometer 132 is a sensitivity control utilized in calibrating applicant's improved wind direction indicator arrangement so that originally when the calibration is first made the alignment of the weather vane 12 in the direction indicated by the arrow 106 corresponds to the zero position on the visual display such as meter 108. In general, accordingly in the principals of applicant's invention herein, once this calibration has been made it generally does not have to be changed for a given installation.

The variable resistance potentiometer 130 together with the capacitor 134 provide a time delay circuit for damping the information signal generated by the potentiometer 66. That is, the potentiometer 66 generates an information signal proportional to the variation of the weather vane 12 from the direction indicated by the arrow 106. In order to prevent short time duration changes in the relative wind direction from effecting the visual display the time constant of the variable resistance potentiometer 130 and capacitor 134 damps out the short time duration changes. The amount of damping may be adjusted by varying the resistance of the variable resistance potentiometer 230. Applicant prefers to use a capacitor that is highly resistant to leakage voltage in order to minimize the direct current transmitted therethrough to the meter. This is preferred since such direct current would change the calibration setting with changes in the damping characteristic when the resistance of variable resistance potentiometer 130 is changed.

When the switches 122, 124 and 126 are switched to terminal C it can be seen that the connections 118a and 118b are shunted together so that they are at the same potential through the terminal C on switch 122. Similarly, the connections 120b and 116b are shunted together to be at the same potential. The connection 116a is made the negative through the C terminal on switch 124 by changing this from the connection 120a which the A terminal on switch 124 in the off-the-wind condition. Thus, when all three switches are on the C position it can be seen that the needle 110 will give full scale variation as read on the inner scale 116 of the visual display meter 108 for variations of the wiper arm 104 of potentiometer 66 between the 20° and 50° positions as indicated by the connections 116a and 118a and 116b and 118b respectively. These are the ranges of importance in the close hauled condition.

A Zener diode 140 is connected across the battery 128, which, for example, may be a 12-volt battery, and, together with resistor 142 provides a constant voltage output from the battery 128 for operation of the indicating means 100.

In practice, applicant has found that, for sailboat applications, the low-torque potentiometer 66 may be a 5,000-ohm potentiometer. The variable potentiometer resistor 130 may be 50,000 ohms and the potentiometer 132 may be 100,000 ohms.

The Zener diode 140 may be a 9-volt Zener diode to provide a constant 9-volt voltage potential and the resistor 142 may be on the order of 37 ohms. The capacitor 134 may be on the order of 100 microfarads.

This concludes the description of applicant's invention. From the above it is apparent that applicant has provided an improved wind-indicating arrangement particularly adapted to sailboat applications wherein two modes of operation for the indicating system are provided to allow a visual display of the relative wind direction. Those skilled in the art may find many variations and adaptations of applicant's improved wind direction indicator. Accordingly, the following claims are intended to cover all such variations and adaptions falling within the true scope and spirit of the invention.

What is claimed as new and desired to be secured by Letters Patent of the United States is:

1. In a wind direction indicating arrangement for a sailboat, said wind-direction-indicating arrangement of the type having a wind direction detection means for detecting the direction of the wind and generating an information signal having a magnitude proportional to the angular difference between the detected wind direction and a predetermined alignment direction corresponding to the fore-and-aft centerline of the sailboat, the improvement comprising, in combination:
   an indicating means comprising a visual display means comprising an electric meter having a dial face and a needle movable relative to said dial face and said needle moving in response to said information signal and said dial face having:
   first scale means for indicating said angular difference between said detected wind direction and said predetermined alignment direction for said detected wind direction between 0° and 180° in a clockwise direction from said predetermined alignment direction and for said detected wind direction between 0° and 180° in a counterclockwise direction from said predetermined alignment direction; and
   said meter having a first arcuate portion on the order of 6° centered to correspond to said 0° direction and said 0° direction corresponding to dead ahead for said sailboat and said display means reading 0° for wind direction corresponding to 0° to 3° in a clockwise direction and 0° and 3° in a counterclockwise direction from said predetermined alignment direction; said
   said dial face of said display means further comprises:
   a second scale means for providing a second indication for indicating said measured wind direction within a predetermined first angular range of less than 180° in a clockwise direction and in a counterclockwise direction from said predetermined alignment direction, and said needle moving relative to said dial face in a first mode of operation for indicating wind directions on said first scale and in a second mode of operation for indicating wind direction on said second scale; and
   said needle moving relative to said dial face substantially the same for full scale deflection on said first scale and on said second scale; and
   means for switching from said first mode of operation to said second mode of operation and from said second mode of operation to said first mode of operation.

2. The arrangement defined in claim 1 wherein:
said wind direction detection means further comprises:
   a housing means having walls defining a cavity therethrough extending from a base portion thereof to a spaced-apart top portion thereof, and said cavity having a potentiometer-receiving chamber adjacent said base portion and a bearing-receiving chamber adjacent said top portion;
   a low-torque potentiometer positioned in said potentiometer-receiving chamber and having a drive shaft extending a predetermined distance into said bearing receiving chamber;
   a coupling shaft drivingly engaging said potentiometer drive shaft and rotatingly mounted in said bearing-receiving chamber of said cavity for rotating said potentiometer drive shaft;
   a cover means for covering said top portion of said cavity;
   base means coupled to said housing for sealingly closing said cavity at said base portion thereof;
   weather vane shaft drivingly coupled to said coupling shaft and extending away therefrom for rotating said coupling shaft;
   weather vane means having a transverse shaft means coupled to said weather vane shaft, body means coupled to said transverse shaft for positioning said transverse shaft in a first alignment direction parallel to the wind direction, and a nose counterweight, and said weather vane means rotating said weather vane shaft to rotate said potentiometer to a predetermined position corresponding thereto to generate said information signal.

3. The arrangement defined in claim 2 wherein:
said body means of said weather vane further comprises:
   a first side member and a second side member and said first side member and said second side member are substantially identical and each define a vertically disposed airfoil section, and said body means is coupled to said transverse shaft adjacent to an aft end thereof;
   and said nose counterweight coupled to said transverse shaft adjacent a forward end thereof; said cover means is coupled to said coupling shaft
   and rotates therewith, and said cover means is spaced a predetermined distance from said top portion of said cavity;
a bearing mounted in said bearing receiving chamber;
said coupling shaft is rotatingly supported in said bearing mounted in said bearing-receiving chamber of said cavity;
said bearing-receiving chamber and said potentiometer-receiving chamber each further comprise an oil reservoir storage portion;
and oil in said oil reservoir portion and said oil having a specific gravity greater than the specific gravity of water for lubricating said potentiometer and said bearing.

4. A wind direction indicator comprising, in combination:
a housing means having walls defining a cavity therethrough extending from a base portion thereof to a spaced-apart top portion thereof, and said cavity having a potentiometer-receiving chamber adjacent said base portion and a bearing-receiving chamber adjacent said top portion;
a low-torque potentiometer positioned in said potentiometer-receiving chamber and having a predetermined alignment direction and having a drive shaft extending a predetermined distance into said bearing-receiving chamber;

a coupling shaft drivingly engaging said drive shaft of said potentiometer and rotatingly mounted in said bearing-receiving chamber of said cavity for rotating said drive shaft;

cover means for covering said top portion of said cavity;

base means coupled to said housing for sealingly closing said cavity at said base portion thereof;

a weather vane shaft drivingly coupled to said coupling shaft and extending therefrom for rotating said coupling shaft;

weather vane means comprising:
a transverse shaft means coupled to said weather vane shaft;
a body means coupled to said transverse shaft for positioning said transverse shaft in first alignment directions parallel to the wind direction; and
a nose counterweight coupled to said transverse shaft in spaced-apart relationship to said body means;

and said weather vane means rotating said weather vane shaft to rotate said potentiometer into predetermined positions corresponding thereto and said potentiometer generating an information signal having a magnitude proportional to the angular separation between said first alignment direction and said predetermined alignment direction;

indicating means for receiving said information signal and having a display means for providing visual display proportional to the magnitude of said information signal; and said indicating means comprising a display means, and said indicating means having a first mode of operation for providing a first indication on said display means for indicating said first alignment direction for the condition of said first alignment direction between 0° and 180° in a clockwise direction from said predetermined alignment direction, and a second indication on said display means for indicating said first alignment direction, and a second indication on said display means for indicating said first alignment direction for the condition of said first alignment direction, between 0° and 180° in a counterclockwise direction from said predetermined alignment direction, and further means providing a second mode of operation for providing a third indication on said display means for indicating said first alignment direction for the condition of said first alignment direction within a first predetermined angular range less than 180° in a clockwise direction from said predetermined alignment direction, and a fourth indication on said display means for indicating said first alignment direction for the condition of said first alignment direction within said predetermined angular range in a counterclockwise direction from said predetermined alignment direction.

6. The arrangement defined in claim 4 wherein:
said first predetermined angular range is on the order of 30° and comprises a range of 20° to 50° in the clockwise direction and counterclockwise direction from said predetermined alignment direction.

6 The arrangement defined in claim 5 and further comprising:
a damping means connected to said potentiometer and to said display means for damping said information signal to damp out small time duration changes in said first alignment direction;
and switch means operatively connected to said display means for switching said display means from said first mode of operation to said second mode of operation.

7. The arrangement defined in claim 4 wherein said weather vane means comprises a body means having a first side member and a second side member, and said first side member and said second side member substantially identical and each define a vertically disposed airfoil section and are coupled to said transverse shaft adjacent to an aft end thereof;
and a nose counterweight coupled to a forward end of said transverse shaft.

8. The arrangement defined in claim 7 wherein:

said cover means is coupled to said coupling shaft and rotates therewith and is spaced a predetermined distance from said top portion of said cavity;

said coupling shaft is rotatingly supported in said bearing-receiving chamber of said cavity by a bearing;

said bearing-receiving chamber of said cavity and said potentiometer-receiving chamber of said cavity each further comprise an oil reservoir portion;

oil having a specific gravity greater than the specific gravity of water in said oil reservoir portions for lubricating said bearing and said potentiometer;

and said first side member and said second side member of said body means of said weather vane means each comprise a thin-walled shell means.

9. A wind direction indicator comprising, in combination:
a housing means having walls defining a cavity therethrough extending from a base portion thereof to a spaced-apart top portion thereof, and said cavity having a potentiometer-receiving chamber adjacent said base portion and a bearing-receiving chamber adjacent said to portion, and said bearing-receiving chamber and said potentiometer receiving chamber each further comprising an oil reservoir storage portion, and in said oil reservoir portion and said oil having a specific gravity greater than the specific gravity of water for lubricating said potentiometer and said bearing;

a low-torque potentiometer positioned in said potentiometer-receiving chamber and having a predetermined alignment direction, and having a drive shaft extending a predetermined distance into said bearing-receiving chamber;

a baring mounted in said bearing-receiving chamber;

a coupling shaft drivingly engaging said drive shaft of said potentiometer, and said coupling shaft rotatingly mounted in said bearing in said bearing-receiving chamber of said cavity, for rotating said drive shaft;

cover means for covering said top portion of said cavity, and said cover means coupled to said coupling shaft and rotating therewith, and said cover means spaced a predetermined distance from said top portion of said cavity;

base means coupled to said housing for sealingly closing said cavity at said base portion thereof;

a weather vane drivingly coupled to said coupling shaft and extending therefrom for rotating said coupling shaft;

weather vane means comprising:
a transverse shaft means coupled to said weather vane shaft;
a body means coupled to said transverse shaft for positioning said transverse shaft in first alignment directions parallel to the wind direction; and
a nose counterweight coupled to said transverse shaft in spaced-apart relationship to said body means;

and said weather vane means rotating said weather vane shaft to rotate said potentiometer into predetermined positions corresponding thereto, and said potentiometer generating an information signal having a magnitude proportional to the angular separation between said first alignment direction and said predetermined alignment direction;

and said body means comprising:
a first side member and a second side member and said first side member and said second side member substantially identical and each defining a vertically disposed airfoil section, and said body means coupled to said transverse shaft adjacent an aft end thereof; and
and said nose counterweight coupled to said transverse shaft adjacent a forward end thereof;

and indicating means for receiving said information signal and having a display means for providing a visual display proportional to the magnitude of said information signal.

10. The arrangement defined in claim 9 wherein said first side member and said second side member of said body means comprise thin-walled shell means.

* * * * *